(12) United States Patent
Wang

(10) Patent No.: US 9,042,920 B2
(45) Date of Patent: May 26, 2015

(54) METHOD FOR PROCESSING PAGING AND MOBILE SWITCHING CENTER

(71) Applicant: Huawei Technologies Co., Ltd., Shenzhen (CN)

(72) Inventor: Guiqian Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 189 days.

(21) Appl. No.: 13/799,912

(22) Filed: Mar. 13, 2013

(65) Prior Publication Data

US 2013/0196695 A1 Aug. 1, 2013

Related U.S. Application Data

(63) Continuation of application No. PCT/CN2011/084286, filed on Dec. 20, 2011.

(30) Foreign Application Priority Data

Dec. 29, 2010 (CN) .......................... 2010 1 0624700

(51) Int. Cl.
*H04W 68/00* (2009.01)
*H04W 68/02* (2009.01)

(52) U.S. Cl.
CPC ............ *H04W 68/005* (2013.01); *H04W 68/02* (2013.01)

(58) Field of Classification Search
CPC ..... H04W 68/00; H04W 24/00; H04W 24/02; H04W 68/02; H04W 68/005

USPC ........ 455/458, 466, 422.1, 403, 412.1, 412.2, 455/414.1, 414.2; 370/428; 379/67.1, 84, 379/88.13
See application file for complete search history.

(56) References Cited

U.S. PATENT DOCUMENTS 7,489,936 B1 * 2/2009 Liu ............................ 455/456.1
(Continued)

FOREIGN PATENT DOCUMENTS

CN 101111001 A 1/2008
(Continued)

OTHER PUBLICATIONS

Foreign Communication From a Counterpart Application, European Application No. 11854115.0, Extended European Search Report dated Aug. 22, 2014, 6 pages.
Foreign Communication From A Counterpart Application, PCT Application PCT/CN2011/084286, International Search Report dated Mar. 22, 2012, 6 pages.
(Continued)

*Primary Examiner* — Ajit Patel
(74) *Attorney, Agent, or Firm* — Conley Rose, P.C.; Grant Rodolph

(57) ABSTRACT

A method for processing paging and a mobile switching center are provided in embodiments of the present invention, where the method includes: buffering, by a mobile switching center when a mobile terminal is performing a first communication service, a paging message triggered by a second communication service for paging the mobile terminal; and sending, by the mobile switching center, the paging message to the mobile terminal after the mobile terminal ends the first communication service.

11 Claims, 2 Drawing Sheets

(56) References Cited

U.S. PATENT DOCUMENTS

| | | | |
|---|---|---|---|
| 8,265,660 B1* | 9/2012 | Vargantwar et al. | 455/458 |
| 2005/0181767 A1* | 8/2005 | Boland et al. | 455/412.2 |
| 2009/0196288 A1 | 8/2009 | Li et al. | |
| 2009/0209234 A1 | 8/2009 | Bright et al. | |
| 2010/0203905 A1* | 8/2010 | Chaubey et al. | 455/458 |
| 2012/0322426 A1 | 12/2012 | Li et al. | |

FOREIGN PATENT DOCUMENTS

| | | |
|---|---|---|
| CN | 101119542 A | 2/2008 |
| CN | 101778345 A | 7/2010 |
| CN | 101835123 A | 9/2010 |
| CN | 102143583 A | 8/2011 |
| WO | 9405124 A1 | 3/1994 |

OTHER PUBLICATIONS

Foreign Communication From A Counterpart Application, PCT Application PCT/CN2011/084286, Written Opinion dated Mar. 22, 2012, 5 pages.

Foreign Communication From A Counterpart Application, Chinese Application 201010624700.X, Chinese Office Action dated Dec. 24, 2012, 6 pages.

Foreign Communication From A Counterpart Application, Chinese Application 201010624700.X, Partial English Translation of Chinese Office Action dated Dec. 24, 2012, 3 pages.

Foreign Communication from a Counterpart Application, PCT Application PCT/CN2011/084286, English Translation International Search Report, dated Mar. 22, 2012, 2 pages.

* cited by examiner

US 9,042,920 B2

METHOD FOR PROCESSING PAGING AND MOBILE SWITCHING CENTER

CROSS-REFERENCE TO RELATED APPLICATIONS

This application is a continuation of International Application No. PCT/CN2011/084286, filed on Dec. 20, 2011, which claims priority to Chinese Patent Application No. 201010624700.X, filed on Dec. 29, 2010, both of which are hereby incorporated by reference in their entireties.

FIELD

Embodiments of the present invention relate to communication technologies and in particular to a method for processing paging and a mobile switching center.

BACKGROUND

When a mobile switching center is paging a mobile terminal (User Equipment, UE for short), the UE is performing another communication service, such as a call service (a calling party service or a called party service), a short message service (a mobile-originated short message service or a mobile-terminated short message service), an unstructured supplementary service data (Unstructured Supplementary Service Data, USSD for short) service, or a location based service (Location Based Services, LBS for short).

In the prior art, when the UE is performing another communication service, a radio resource (Radio Resource, RR for short) connection is being established or the RR connection is already established, and the UE no longer listens to a paging channel, causing a paging failure.

SUMMARY

Embodiments of the present invention provide a method for processing paging and a mobile switching center, so as to increase the paging success rate.

An embodiment of the present invention provides a method for processing paging, including: buffering, by a mobile switching center when a mobile terminal is performing a first communication service, a paging message triggered by a second communication service for paging the mobile terminal; and sending, by the mobile switching center, the paging message to the mobile terminal after the mobile terminal ends the first communication service.

An embodiment of the present invention further provides a mobile switching center, including: a buffering module, configured to: when a mobile terminal is performing a first communication service, buffer a paging message triggered by a second communication service for paging the mobile terminal; and a paging module, configured to send the paging message to the mobile terminal after the mobile terminal ends the first communication service.

It can be seen from the preceding technical solutions that, in the embodiments of the present invention, when the mobile terminal is performing the first communication service, the mobile switching center buffers the paging message triggered by the second communication service for paging the mobile terminal; and after the mobile terminal ends the first communication service, the mobile switching center may send the paging message to the mobile terminal, thereby increasing the paging success rate.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art can derive other drawings from these accompanying drawings without creative efforts.

DETAILED DESCRIPTION OF THE EMBODIMENTS

To make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
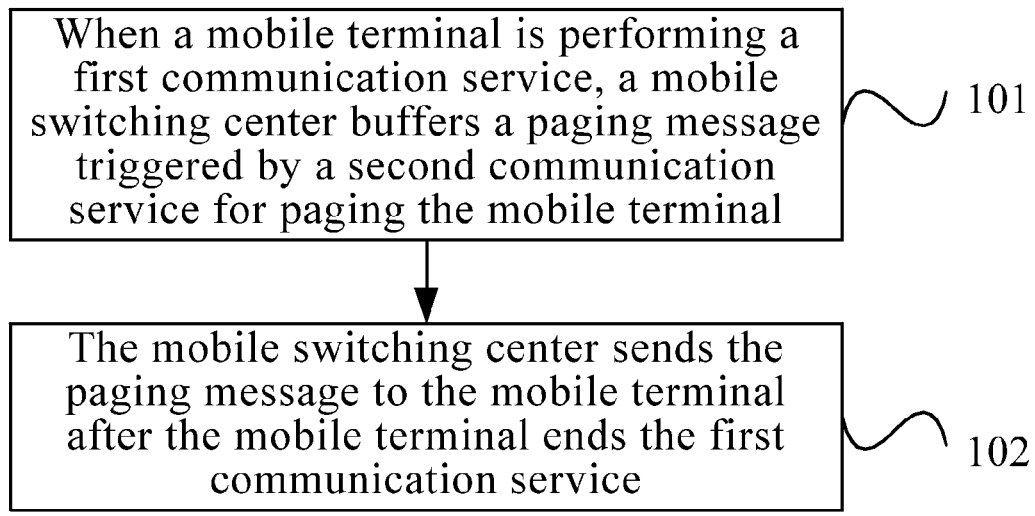
FIG. 1 is a schematic flow chart of a method for processing paging according to a first embodiment of the present invention.

FIG. 1 is a schematic flow chart of a method for processing paging according to a first embodiment of the present invention. As shown in FIG. 1, the method for processing paging in this embodiment may include the following steps.

Step 101: When a mobile terminal is performing a first communication service, a mobile switching center buffers a paging message triggered by a second communication service for paging the mobile terminal, where the first communication service may include but is not limited to a call service (a calling party service or a called party service), a short message service (a mobile-originated short message service or a mobile-terminated short message service), a USSD service or an LBS service; and the second communication service may include but is not limited to a downlink call service (a called party service) or a downlink short message service (a mobile-terminated short message service). Persons skilled in the art should understand that: the time for performing the first communication service needs to be shorter than that allowed for paging, by the mobile switching center, the mobile terminal, as triggered by the second communication service.

Specifically, when the mobile terminal is in an idle state (that is, the mobile terminal is not performing any communication service), the mobile switching center sends the paging message triggered by the second communication service (the downlink call service or the downlink short message service) for paging the mobile terminal, to the mobile terminal. Before the mobile terminal receives the paging message and when the mobile terminal starts to perform the first communication service (a communication service such as a call service, a short message service, a USSD service, or an LBS), the mobile switching center buffers a paging message triggered by the second communication service for re-paging the mobile terminal (after paging the mobile terminal times out). Therefore, the mobile switching center buffers the paging message triggered by the second communication service for paging the mobile terminal, rather than repeatedly sending the paging message for re-paging the mobile terminal to the mobile terminal. This saves paging channels and thereby avoids invalid occupation of air interface paging channels; or after the terminal starts to perform the first communication service (a communication service such as a call service, a short message service, a USSD service or an LBS), and before the mobile switching center delivers the paging message triggered by the second communication service (a downlink call service or a downlink short message service) for paging the mobile terminal, the mobile switching center starts to buffer the paging message triggered by the second communication service (a downlink call service or a downlink short message service) for paging the mobile terminal. Therefore, at the beginning the mobile switching center does not send the paging message triggered by the second communication service for paging the mobile terminal for the first time to the mobile terminal, but only buffers the paging message triggered by the second communication service for paging the mobile terminal. This saves paging channels and thereby avoids invalid occupation of air interface paging channels.

Step 102: The mobile switching center sends the paging message to the mobile terminal after the mobile terminal ends the first communication service.

In this embodiment, when the mobile terminal starts to perform the first communication service before receiving the paging message triggered by the second communication service, the mobile switching center buffers the paging message triggered by the second communication service for paging the mobile terminal. Then, the mobile switching center may send the paging message to the mobile terminal after the mobile terminal ends the communication service, thereby increasing the paging success rate.

The method for processing paging in this embodiment is applicable to multiple mobile communications networks, such as Global System for Mobile Communications (Global System for Mobile Communications, GSM for short), Universal Mobile Telecommunications System (Universal Mobile Telecommunication System, UMTS for short) network, and Code Division Multiple Access (Code Division Multiple Access, CDMA for short).

Figure 2:
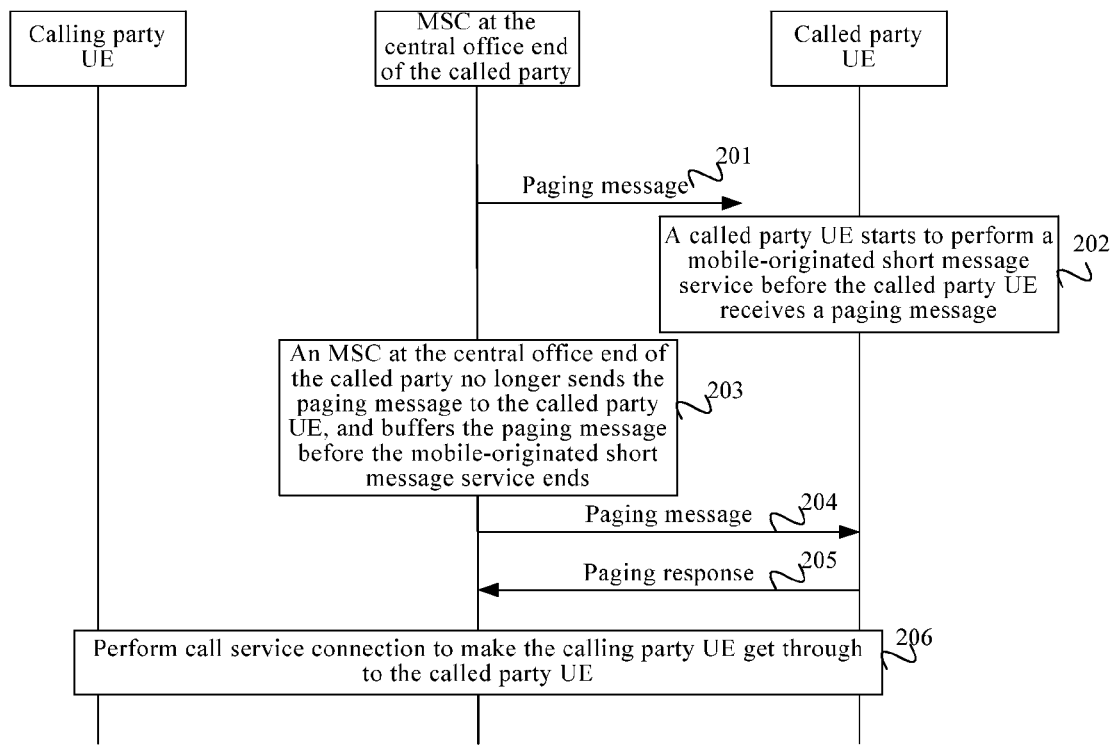
FIG. 2 is a schematic flow chart of a method for processing paging according to a second embodiment of the present invention.

FIG. 2 is a schematic flow chart of a method for processing paging according to a second embodiment of the present invention. This embodiment is a specific embodiment of the first embodiment of the present invention. As shown in FIG. 2, the method for processing paging in this embodiment may include the following steps.

Step 201: when a calling party UE calls a called party UE and when the called party UE is in an idle state, an MSC at the central office end of the called party sends a paging message to the called party UE during call incoming.

Step 202: The called party UE starts to perform a mobile-originated short message service before the called party UE receives the paging message.

Step 203: The MSC at the central office end of the called party no longer sends the paging message to the called party UE, and buffers the paging message before the mobile-originated short message service ends.

Step 204: The MSC at the central office end of the called party sends the buffered paging message to the called party UE after the mobile-originated short message service ends.

Step 205: The called party UE sends a paging response to the MSC at the central office end of the called party after receiving the paging message.

Step 206: After receiving the paging response, the MSC at the central office end of the called party performs call service connection to connect the call between the calling party UE and the called party UE.

In this embodiment, when the called party UE starts to perform the mobile-originated short message service before receiving the paging message triggered by a called party service for paging the called party UE, the MSC at the central office end of the called party buffers a paging message triggered by the called party service for re-paging the called party UE. Then, the MSC at the central office end of the called party may send the buffered paging message to the called party UE after the called party UE ends the mobile-originated short message service, thereby increasing the paging success rate. In addition, paging channels are saved and thereby invalid occupation of air interface paging channels is avoided by using the method for processing paging in this embodiment, because the MSC at the central office of the called party buffers the paging message triggered by the called party service for paging the called party UE rather than repeatedly sending the paging message triggered by the called party service for re-paging the called party UE.

Figure 3:
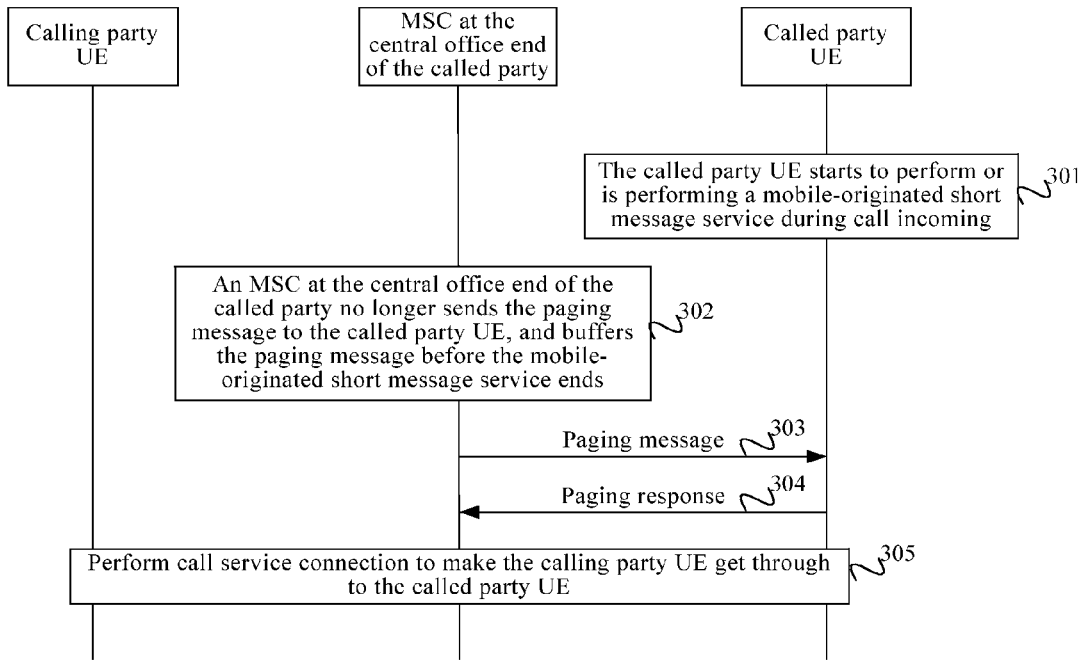
FIG. 3 is a schematic flow chart of a method for processing paging according to a third embodiment of the present invention.

FIG. 3 is a schematic flow chart of a method for processing paging according to a third embodiment of the present invention. This embodiment is another specific embodiment of the first embodiment of the present invention. As shown in FIG. 3, the method for processing paging in this embodiment may include the following steps.

Step 301: A calling party UE calls a called party UE. The called party UE is performing or starts to perform a mobile-originated short message service during the call incoming.

Step 302: An MSC at the central office end of the called party does not send a paging message to the called party UE, and buffers the paging message before the mobile-originated short message service ends.

Step 303: The MSC at the central office end of the called party sends the buffered paging message to the called party UE after the mobile-originated short message service ends.

Step 304: The called party UE returns a paging response to the MSC at the central office end of the called party after receiving the paging message.

Step 305: After receiving the paging response, the MSC at the central office end of the called party performs call service connection to connect the call between the calling party UE and the called party UE.

In this embodiment, when the called party UE is performing the mobile-originated short message service and the MSC at the central office end of the called party needs to page the called party UE after a called party service is triggered, the MSC at the central office end of the called party may buffer the paging message triggered by the called party service for paging the called party UE, and the MSC at the central office end of the called party may send the paging message to the called party UE after the called party UE ends the mobile-originated short message service, thereby increasing the paging success rate. In addition, paging channels are saved and thereby invalid occupation of air interface paging channels is avoided by using the method for processing paging in this embodiment because at the beginning the mobile switching center does not send the paging message triggered by the second communication service for paging the mobile terminal for the first time to the mobile terminal, but only buffers the paging message triggered by the second communication service for paging the mobile terminal.

It should be noted that, for brevity, the above method embodiments are represented as a series of actions. Those skilled in the art, however, should appreciate that the present invention is not limited to the order of the described actions, because according to the present invention, some steps may adopt other order or occur simultaneously. It should be further understood by persons skilled in the art that the described embodiments all belong to exemplary embodiments, and the involved actions and modules are not necessarily required by the present invention.

In the above embodiments, the description of each embodiment has its emphasis, and some embodiments may not be detailed. Reference may be made to the relevant description of other embodiments.

Figure 4:
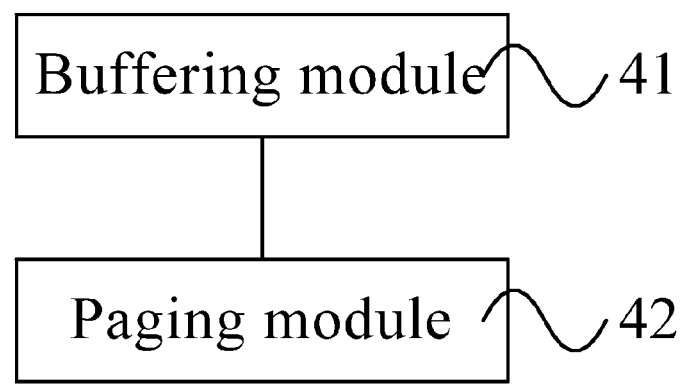
FIG. 4 is a schematic structural diagram of a mobile switching center according to a fourth embodiment of the present invention.

FIG. 4 is a schematic structural diagram of a mobile switching center according to a fourth embodiment of the present invention. As shown in FIG. 4, the mobile switching center in this embodiment may include a buffering module 41 and a paging module 42, where the buffering module 41 is configured to: when a mobile terminal is performing a first communication service, buffer a paging message triggered by a second communication service for paging the mobile terminal, and the paging module 42 is configured to send the paging message to the mobile terminal after the mobile terminal ends the first communication service, where the first communication service may include but is not limited to a call service (a calling party service or a called party service), a short message service (a mobile-originated short message service or a mobile-terminated short message service), a USSD service or an LBS service; and the second communication service may include but is not limited to a downlink call service (a called party service) or a downlink short message service (a mobile-terminated short message service). Persons skilled in the art should understand that: the time for performing the first communication service needs to be shorter than that allowed for paging, by the mobile switching center, the mobile terminal, as triggered by the second communication service.

Functions of the mobile terminal in the first embodiment and the called party UE in the second and third embodiments may be implemented by the mobile switching center provided in this embodiment.

In this embodiment, when the mobile terminal starts to perform the first communication service before receiving the paging message triggered by the second communication service, the buffering module buffers the paging message for paging the mobile terminal, and the paging module sends the paging message to the mobile terminal after the mobile terminal ends the first communication service, thereby increasing the paging success rate.

Specifically, the paging module 42 in this embodiment may further be configured to send the paging message triggered by the second communication service (a downlink call service or a downlink short message service) for paging the mobile terminal to the mobile terminal when the mobile terminal is in an idle state; and accordingly, the buffering module 41 in this embodiment may specifically be configured to: before the mobile terminal receives the paging message and when the mobile terminal starts to perform the first communication service (a communication service such as a call service, a short message service, a USSD service or an LBS), buffer a paging message triggered by the second communication service for re-paging the mobile terminal.

Alternatively, the buffering module 41 in this embodiment may specifically be configured to: after the mobile terminal starts to perform the first communication service and before the paging module 42 delivers the paging message triggered by the second communication service (a downlink call service or a downlink short message service) for paging the mobile terminal, start to buffer the paging message triggered by the second communication service (a downlink call service or a downlink short message service) for paging the mobile terminal.

Persons of ordinary skill in the art should understand that all or part of the steps of the method specified in any embodiment of the present invention may be implemented by a program instructing relevant hardware. The program may be stored in a computer readable storage medium. When the program runs, the program executes the steps of the method specified in any embodiment above. The storage medium may be any medium capable of storing program codes, such as ROM, RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments, or make equivalent substitutions to some technical features thereof, without departing from the spirit and scope of the technical solutions of the embodiments of the present invention.

What is claimed is:

1. A method for processing paging, comprising:
   sending, by a mobile switching center, a paging message to a mobile terminal when the mobile terminal is in an idle state, wherein the paging message is triggered by a second communication service for paging the mobile terminal; and
   buffering, by the mobile switching center, the paging message triggered by the second communication service for re-paging the mobile terminal before the mobile terminal receives the paging message and when the mobile terminal starts to perform a first communication service; and
   sending, by the mobile switching center, the paging message to the mobile terminal after the mobile terminal ends the first communication service, thereby increasing the paging success rate,
   wherein a time for performing the first communication service is shorter than a time allowed for paging the mobile terminal as triggered by the second communication service.

2. The method according to claim 1, wherein buffering the paging message comprises buffering, by the mobile switching center the paging message triggered by the second communication service for paging the mobile terminal after the mobile terminal starts to perform the first communication service and before the mobile switching center delivers the paging message triggered by the second communication service for paging the mobile terminal.

3. The method according to claim 1, wherein the time for performing the first communication service is shorter than that allowed for paging, by the mobile switching center, the mobile terminal, as triggered by the second communication service.

4. The method according to claim 1, wherein the first communication service comprises a call service, a short message service, an unstructured supplementary service data service, or a location based service, and wherein the second communication service comprises a downlink call service or a downlink short message service.

5. A mobile switching center, comprising:
a buffering module configured to buffer a paging message triggered by a second communication service for re-paging a mobile terminal before the mobile terminal receives the paging message and when the mobile terminal starts to perform a first communication service; and a paging module configured to:
send the paging message triggered by the second communication service for paging the mobile terminal to the mobile terminal when the mobile terminal is in an idle state; and send the paging message to the mobile terminal after the mobile terminal ends the first communication service, thereby increasing the paging success rate, wherein a time for performing the first communication service is shorter than a time allowed for paging the mobile terminal as triggered by the second communication service.

6. The mobile switching center according to claim 5, wherein the buffering module is further configured to buffer the paging message triggered by the second communication service for paging the mobile terminal after the mobile terminal starts to perform the first communication service and before the paging module delivers the paging message triggered by the second communication service for paging the mobile terminal.

7. The mobile switching center according to claim 5, wherein the first communication service comprises a call service, a short message service, an unstructured supplementary service data service, or a location based service, and wherein the second communication service comprises a downlink call service or a downlink short message service.

8. An apparatus comprising:
a processor configured to:
send a paging message to a mobile terminal when the mobile terminal is in an idle state, wherein the paging message is triggered by a first communication service for paging the mobile terminal;

buffer the paging message triggered by the first communication service for re-paging the mobile terminal before the mobile terminal receives the paging message and when the mobile terminal starts to perform a second communication service; and send the paging message to the mobile terminal after the mobile terminal ends the second communication service, thereby increasing the paging success rate, wherein a time for performing the first communication service is shorter than a time allowed for paging the mobile terminal as triggered by the second communication service.

9. The apparatus according to claim 8, wherein buffering the paging message comprises buffering the paging message triggered by the first communication service for paging the mobile terminal after the mobile terminal starts to perform the second communication service and before delivery of the paging message triggered by the first communication service for paging the mobile terminal.

10. The apparatus according to claim 8, wherein the time for performing the second communication service is shorter than that allowed for paging the mobile terminal, as triggered by the first communication service.

11. The apparatus according to claim 8, wherein the second communication service comprises a call service, a short message service, an unstructured supplementary service data service, or a location based service, and wherein the first communication service comprises a downlink call service or a downlink short message service.

* * * * *